(12) United States Patent
Kai et al.

(10) Patent No.: US 6,889,068 B2
(45) Date of Patent: May 3, 2005

(54) HEAT CUTOFF SIGNAL TRANSMISSION UNIT AND SUPERCONDUCTING SIGNAL TRANSMISSION APPARATUS

(75) Inventors: Manabu Kai, Kawasaki (JP); Toru Maniwa, Kawasaki (JP); Kazunori Yamanaka, Kawasaki (JP); Akihiko Akasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/208,701

(22) Filed: Jul. 29, 2002

(65) Prior Publication Data

US 2002/0187902 A1 Dec. 12, 2002

Related U.S. Application Data

(63) Continuation of application No. PCT/JP00/00524, filed on Jan. 31, 2000.

(51) Int. Cl.$^7$ .............................. H01P 5/02; H01B 12/02
(52) U.S. Cl. ...................... 505/210; 505/700; 505/703; 505/706; 333/99 S; 333/260
(58) Field of Search ................................. 333/995, 260; 505/210, 700, 703, 706

(56) References Cited

U.S. PATENT DOCUMENTS

| | | | | |
|---|---|---|---|---|
| 5,773,875 A | * | 6/1998 | Chan ....................... | 505/703 X |
| 5,856,768 A | * | 1/1999 | Hey-Shipton et al. .. | 333/260 X |
| 6,154,103 A | * | 11/2000 | Scharen et al. .......... | 333/260 X |
| 6,188,358 B1 | * | 2/2001 | Clynne .................... | 333/260 X |
| 6,392,510 B2 | * | 5/2002 | Gregorwich ............. | 333/995 X |

FOREIGN PATENT DOCUMENTS

| | | |
|---|---|---|
| EP | 0 367 630 | 5/1990 |
| EP | 0 883 178 | 12/1998 |
| JP | 51-23702 | 7/1976 |
| JP | 55-28244 | 2/1980 |
| JP | 61-269319 | 11/1986 |
| JP | 2-180055 | 7/1990 |
| JP | 5-275755 | 10/1993 |
| JP | 9-129041 | 5/1997 |
| JP | 9-134618 | 5/1997 |
| JP | 9-147634 | 6/1997 |
| JP | 9-246520 | 9/1997 |
| JP | 11-214215 | 8/1999 |

OTHER PUBLICATIONS

"Transmission Line with Windowed Ground Plane"; *IBM Technical Disclosure Bulletin*; vol. 33, No. 4; pp. 152,153; Copy in Cl333/238, Sep. 1990.*

K. Sugai, et al., "Multilayer Alumina Substrates for ECU Automotive Electronics" 22$^{nd}$ IEEE/CPMT International Electronics Manufacturing Technology Symposium–Electronics Manufacturing and Development for Automotives; Apr. 27–29, 1998, pp. 109–112 XP002229333.

* cited by examiner

*Primary Examiner*—Benny T. Lee
(74) *Attorney, Agent, or Firm*—Katten Muchin Zavis Rosenman (57) ABSTRACT

A superconducting signal transmission apparatus provided with a vacuum container 11, a superconducting electronic device 12 provided in the vacuum container 11, an input side transmission line 13 and output side transmission line 14 for connection to the superconducting electronic device 12 through the vacuum container 11, and a cooling mechanism (15, 16, 17) for cooling the superconducting electronic device 12 and further having a heat cutoff signal transmission unit 20 inserted at least at part of the input side and output side transmission lines 13 and 14. The heat cutoff signal transmission unit 20 is comprised of a substrate 31 and a flat circuit body 30 provided with a signal transmission line 32 and ground layer (33, 33-1, 33-2). The substrate 31 is comprised of a dielectric material having a small heat conductivity. The conductor portions forming the signal transmission line 32 and the ground layer are formed with thin thicknesses enabling suppression of the inflow of heat from the outside.

10 Claims, 8 Drawing Sheets

| MODEL | AMOUNT OF INFLOW HEAT | TRANSMISSION LOSS |
|---|---|---|
| UNIT 20 (WITHOUT SLITS 35) | 0.14W | 0.079 dB |
| UNIT 20 (WITH SLITS 35) | 0.1W | 0.105 dB |

HEAT CUTOFF SIGNAL TRANSMISSION UNIT AND SUPERCONDUCTING SIGNAL TRANSMISSION APPARATUS

CROSS-REFERENCE TO RELATED APPLICATION

This application is a continuation application and is based upon PCT/JP00/00524, filed on Jan. 31, 2000.

TECHNICAL FIELD

The present invention relates to a heat cutoff signal transmission unit for maintaining a superconducting electronic device operating at a cryogenic temperature efficiently in a cryogenic state and a superconducting signal transmission apparatus using the same.

Recently, superconducting electronic devices operating under a superconducting state have received interest and attention. As such electronic devices, there are for example the superconducting filters able to be used for transceiver apparatuses of base stations in mobile communication systems. Alternatively, there are also SQUID fluxmeters used for measurement of electroencephalograms in medical systems.

Cooling such superconducting electronic devices to less than the cryogenic temperature of 70K requires a considerably large-scale refrigeration machine and consumes a considerably large amount of power. Therefore, research and development (R&D) is underway on superconducting electronic devices and to suppress as much as possible the entry of heat from the outside (room temperature) to a cooled superconducting electronic device.

BACKGROUND ART

Explaining the invention, using a superconducting filter, as an example of the above superconducting electronic device, able to be used for a transceiver apparatus of a base station in the above mobile communication system, in a superconductor able to be used in this superconducting filter, the surface resistance is two to three orders smaller in the microwave band than an ordinary conductor comprised of an ordinary metal. Therefore, even if increasing the number of resonators forming the superconducting filter for obtaining steep cut characteristics, it is possible to reduce the loss in the pass band tremendously. As a result, the use of the superconducting filter improves the reception sensitivity and broadens the area which can be covered by a single base station, so enables the number of base stations to be reduced or the transmission power to be made smaller and gives rise to other major advantages.

To obtain such advantages, it is required to maintain the superconductivity filter used as the superconducting electronic device at a cryogenic temperature stably and inexpensively. Several prior art devices have been proposed to meet this requirement, for example, Japanese Unexamined Patent Publication (Kokai) No. 9-129041, Japanese Unexamined Patent Publication (Kokai) No. 9-134618, Japanese Unexamined Patent Publication (Kokai) No. 9-147634, etc.

These prior art devices will be explained in more detail later using the drawings, but the important point is that the heat flowing into the device from the coaxial cable connected to the superconducting electronic device can be cut off by employing a special heat cutoff structure for that coaxial cable. That is, a heat cutoff coaxial cable has been proposed.

There are however the following problems in the above prior art devices:

(i) Since it is necessary to make a special coaxial cable having a special heat cutoff structure, there is the problem that time is taken for the manufacture and therefore the cost becomes higher. Therefore, this is not suited for mass production.

(ii) If adopting a heat cutoff structure for reducing the thickness of the outer conductor of the coaxial cable, when combining the coaxial cable, superconducting electronic device, and cooling use vacuum container to assemble a single superconducting signal transmission apparatus, there is insufficient flexibility for freely deforming the coaxial cable and therefore there is the problem that assembly becomes difficult. This is due to the fact that a thin outer conductor ends up easily cracking due to bending or other deformation.

(iii) Further, there is the problem that a thin outer conductor ends up peeling off due to vibration transmitted from the cooling refrigeration machine.

(iv) Further, since the above special heat cutoff structure is used only at the outer conductor side of the coaxial cable, there is the problem that there is no heat cutoff effect at all for the flow of heat through the center conductor of the coaxial cable. Therefore, the superconducting state can no longer be maintained at the junction of the center conductor and superconducting electronic device and contact resistance is liable to be generated.

SUMMARY OF THE INVENTION

The present invention has as its object the cutoff of heat at the part of a transmission line between a superconducting electronic device inside a vacuum container and a coaxial cable from the outside of the vacuum container without giving the coaxial cable itself any special heat cutoff structure.

Specifically, it has as its object the provision of a heat cutoff signal transmission unit to be inserted into the above part of the transmission line.

Further, it has as its object the provision of a superconducting signal transmission apparatus incorporating such a heat cutoff signal transmission unit.

The present invention provides a novel heat cutoff signal transmission unit to achieve the above objects. The unit is characterized by being comprised of a flat circuit body provided with a substrate and with a signal transmission line and a ground layer both formed on this substrate, where the substrate is comprised of a dielectric material having a low heat conductivity and where conductor portions forming the signal transmission line and ground layer are formed with a thin thickness enabling suppression of the flow of heat from the outside.

Further, the present invention provides a novel superconducting signal transmission apparatus to achieve the above object. The transmission apparatus is characterized by being provided with a vacuum container, a superconducting electronic device provided in the vacuum container, an input side transmission line and output side transmission line both passing through the vacuum container and connected, respectively, to a signal input end and signal output end of the superconducting electronic device, and a cooling mechanism for cooling the superconducting electronic device, wherein a heat cutoff signal transmission unit is inserted into part of at least one of the input side transmission line and output side transmission line.

BEST MODE FOR CARRYING OUT THE INVENTION

To further facilitate understanding of the present invention, first an explanation will be given of the several conventional examples mentioned above.

Figure 8:
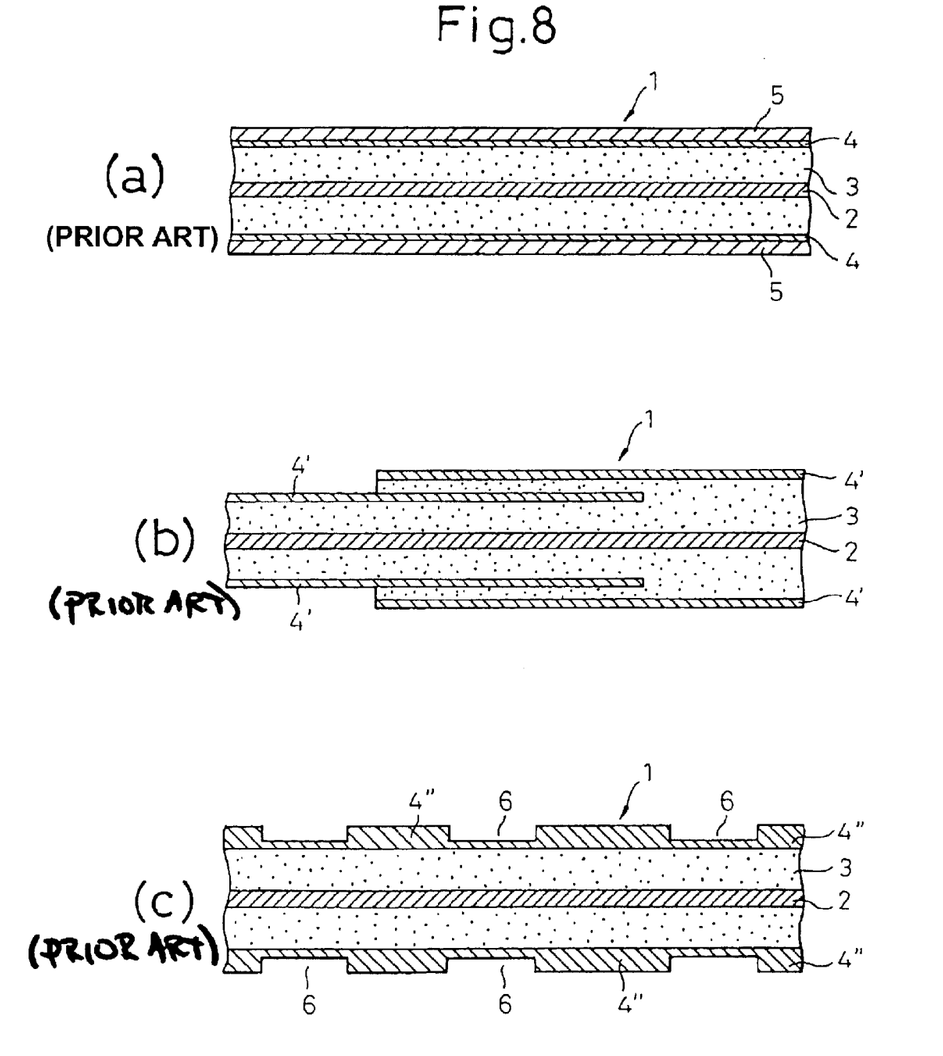
FIG. 8A respectively gives sectional views of coaxial cables having heat cutoff structures according to a conventional first example, second example, and third example.
FIG. 8B respectively gives sectional views of coaxial cables having heat cutoff structures according to a conventional first example, second example, and third example.
FIG. 8C reference numeral 1 indicates a coaxial cable, reference numeral 2 a center conductor, and reference numeral 3 a dielectric. Further, reference numerals 4, 4', and 4" indicate outer conductors of the first, second, and third examples.

FIG. 8 gives sectional vies of coaxial cables having heat cutoff structures according to a conventional first example (a), second (b), and third example (c).

The first example corresponds to the above-mentioned Japanese Unexamined Patent Publication (Kokai) No. 9-129041, the second example to the above-mentioned Japanese Unexamined Patent Publication (Kokai) No. 9-134618, and the third example to the above-mentioned Japanese Unexamined Patent Publication (Kokai) No. 9-147634.

In (a), (b), and (c) of FIG. 8, reference numberal 1 indicates a coaxial cable w a center conductor, and 3 a dielectric. Further, 4, 4', and 4" indicate outer conductors of the first, second, and third examples.

In FIG. 8(a), the outer conductor 4 is configured by a thin, that is, small sectional area metal film so as to obtain a heat cutoff effect, for example, suppress propagation of heat from the left end to the right end in the figure.

In this case, since the metal film (4) is easily damaged, its outer circumference is enclosed by a material 5 having a small heat conductivity and a superior mechanical strength.

In FIG. 8(b), the outer conductor 4' is made of two types of cylindrical conductors of different diameters and a dielectric interposed in the overlapping portions of the two so as to for example suppress the propagation of heat from the left end to the right end in the figure. In the overlapping portions, however, these two types of cylindrical conductors are capacitively coupled with each other. These form a single outer conductor through conductance at a high frequency.

In FIG. 8(C), ring-shaped grooves 6 are formed partially in the outer conductor 4" so as to partially reduce the sectional area of the outer conductor 4" and for example suppress the propagation of heat from the left end to the right end in the figure.

As explained above, according to the above conventional first example, second example, and third example, special heat cutoff structures are given to the outer conductors (4, 4', and 41") of the coaxial cable 1 to suppress the flow of heat to the superconducting electronic devices. Therefore, the above-mentioned problems (i) to (iv) arise.

An example of a superconducting signal transmission apparatus to which the above coaxial cables 1 can be applied will be explained next with reference to the figures.

Figure 9:
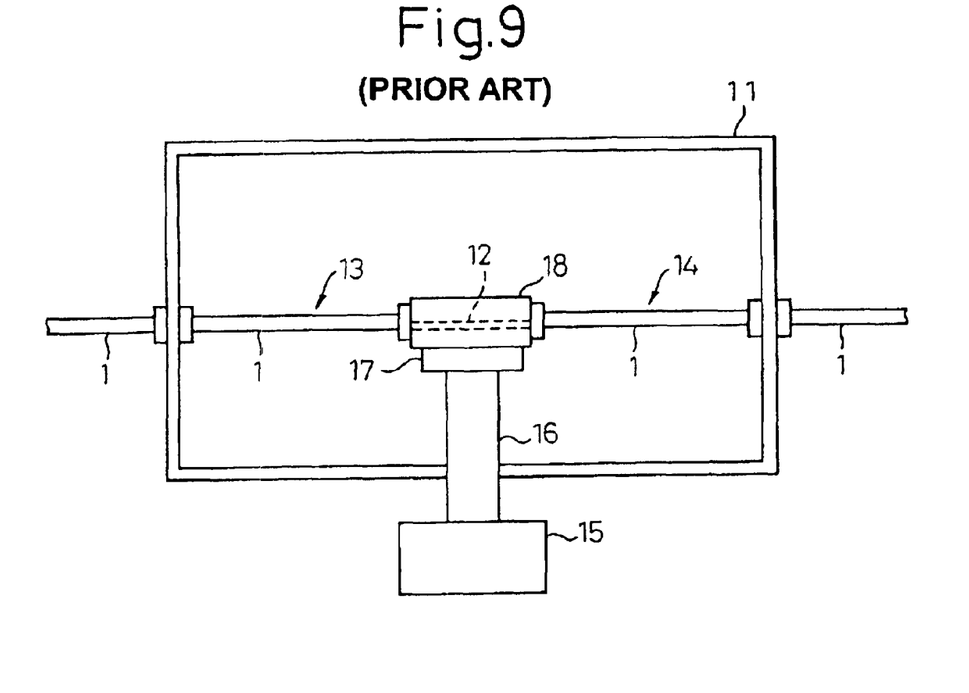
FIG. 9 is a view of an example of a conventional superconducting signal transmission apparatus.

FIG. 9 is a view of an example of a conventional superconducting signal transmission apparatus. Note that in the apparatus of this figure, it is also possible to apply the heat cutoff signal transmission unit according to the present invention.

In FIG. 9, reference numeral 11 is a vacuum container at the center of which is provided a superconducting electronic device 12. This device 12 is a superconducting filter in the case of the above-mentioned transceiver apparatus in a base station. Further, an LNA (low noise amplifier) is provided integrally with this.

The superconducting electronic device 12 is cooled to the cryogenic temperature of 70K. The refrigeration machine for this is shown by reference numeral 15 and is provided at the outside of the vacuum container 11. The refrigeration machine 15 is connected to a cold head 17 through a pole 16 conveying a coolant. A housing 18 of Invar, copper, aluminum, etc. enclosing the device 12 is closely attached to this cold head 17 and cooled substantially uniformly to a certain temperature.

The signal input end and signal output end of the superconducting electronic device 12 cooled in this way are connected through an input side transmission line 13 and output side transmission line 14 to a signal input side coaxial cable 1 and signal output side coaxial cable 1 outside of the vacuum container 11. Note that the above transmission lines 13 and 14 are comprised of coaxial cables 1.

The flow of heat from the outside propagated through the coaxial cables 1 become large loads on the refrigeration machine 15, however. The value of the flow of heat depends on the material, thickness, and length of the coaxial cable 1, but is about 1W in the case of a semirigid cable of a length of 25 cm and a diameter of 2.2 mm, a room temperature outside of the vacuum container 11 of 300K, and a temperature of the cold head 17 of 70K. The refrigeration capacity of the refrigeration machine 15 is determined in relation with the power consumption, but under a cryogenic temperature of 70K, the refrigeration capacity is only several watts or so even with an efficiency of the refrigeration machine (refrigeration machine output (W)/input power (W)) of about 1/20 to 1/1000 or so and a power consumption of for example several hundred watts. When used for an actual system, a plurality of coaxial cables 1 are required such as for simultaneously cooling a plurality of superconducting electronic devices 12 or for input and for output, so the total rate of inflow of heat ends up exceeding the refrigeration capacity of the refrigeration machine 15. Therefore, coaxial cables 1 provided with special heat cutoff structures as shown in FIGS. 8(a) 8(b) and 8(c) are considered necessary. When using such coaxial cables 1, however, the above-mentioned problems arise.

The present invention provides a superconducting signal transmission apparatus giving a sufficient heat cutoff effect without using coaxial cables 1 provided with such special heat cutoff structures, that is, using ordinary coaxial cables (semirigid cables), and further provides a heat cutoff signal transmission unit for the same. These will be explained in detail below.

Figure 1:
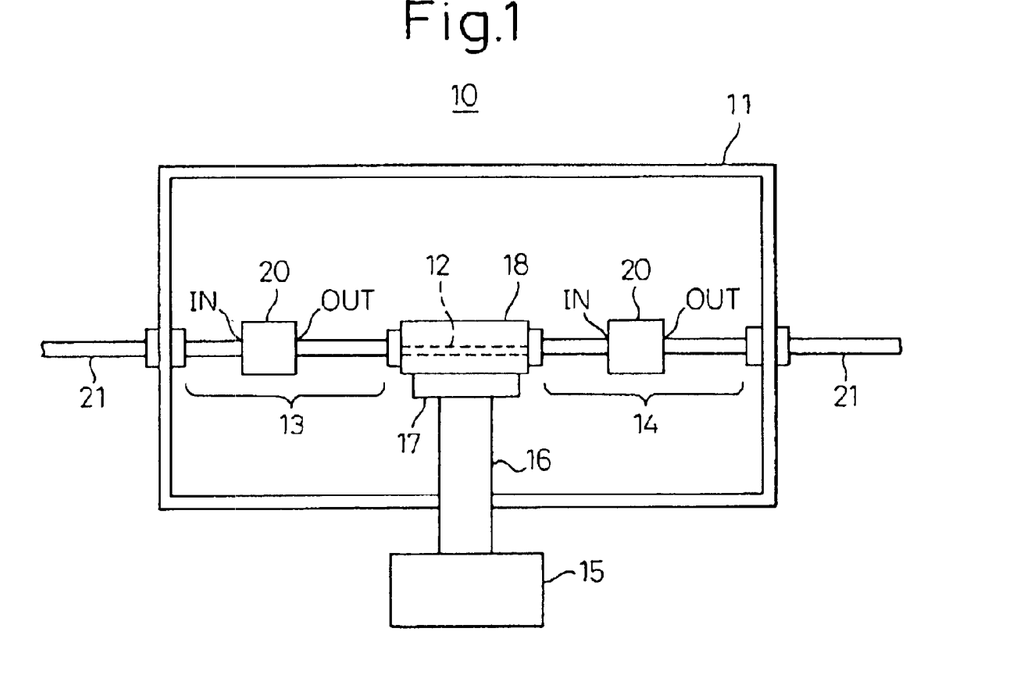
FIG. 1 is a view of a superconducting signal transmission apparatus according to the present invention.

FIG. 1 is a view of a superconducting signal transmission apparatus according to the present invention. Note that throughout the drawings, similar components are shown assigned the same reference numerals or symbols.

Comparing the above-mentioned FIG. 9 and FIG. 1, a heat cutoff signal transmission unit 20 according to the present invention is newly introduced. Further, as the coaxial cable for forming the transmission line of the signal, instead of a coaxial cable having a conventional heat cutoff structure, an ordinary coaxial cable 21 (semirigid cable) is used. It is not however prohibited to use a conventional coaxial cable 1 as the coaxial cable. If jointly using this conventional coaxial cable 1 and the above unit 20 in accordance with need, however, the heat cutoff effect is greatly increased.

As shown in FIG. 1, according to the present invention, there is provided a superconducting signal transmission apparatus 10 provided with a vacuum container 11, superconducting electronic device 12 enclosed in a housing 18 and provided in the vacuum container 11, input side transmission line 13 and output side transmission line 14 passing through the vacuum container 11 and connecting to the signal input end IN and signal output end OUT of the superconducting electronic device 12, and cooling mechanism (15, 16, 17) for cooling the superconducting electronic device 12 wherein a heat cutoff signal transmission unit 20 is inserted into part of at least one of the input side transmission line 13 and output side transmission line 14.

Therefore, transmission units 20 may be inserted into parts of both the transmission lines 13 and 14. FIG. 1 illustrates the configuration of this case.

The transmission lines 13 and 14 may be made by coaxial cables or may be made by other suitable signal transmitting means. Further, the units 20 may be extended to use them as the transmission lines (13 and 14).

Preferably the heat cutoff signal transmission unit 20 is inserted to part of at least one of the input side transmission line 13 and output side transmission line 14 comprised of coaxial cables. In this case, the coaxial cable may be made by an ordinary coaxial cable (semirigid cable) 21 or, as shown in FIG. 9, may be made by a coaxial cable 1 having a heat cutoff structure at its outer conductor.

Therefore, the heat flowing from the outside of the vacuum container 11 through the coaxial cable 21 and transmission lines 13 and 14 is cut off by the heat cutoff signal transmission unit 20. The heat flow reaching the electronic device 12 is greatly restricted.

Next, the above heat cutoff signal transmission unit 20 according to the present invention will be explained in detail.

Figure 2:
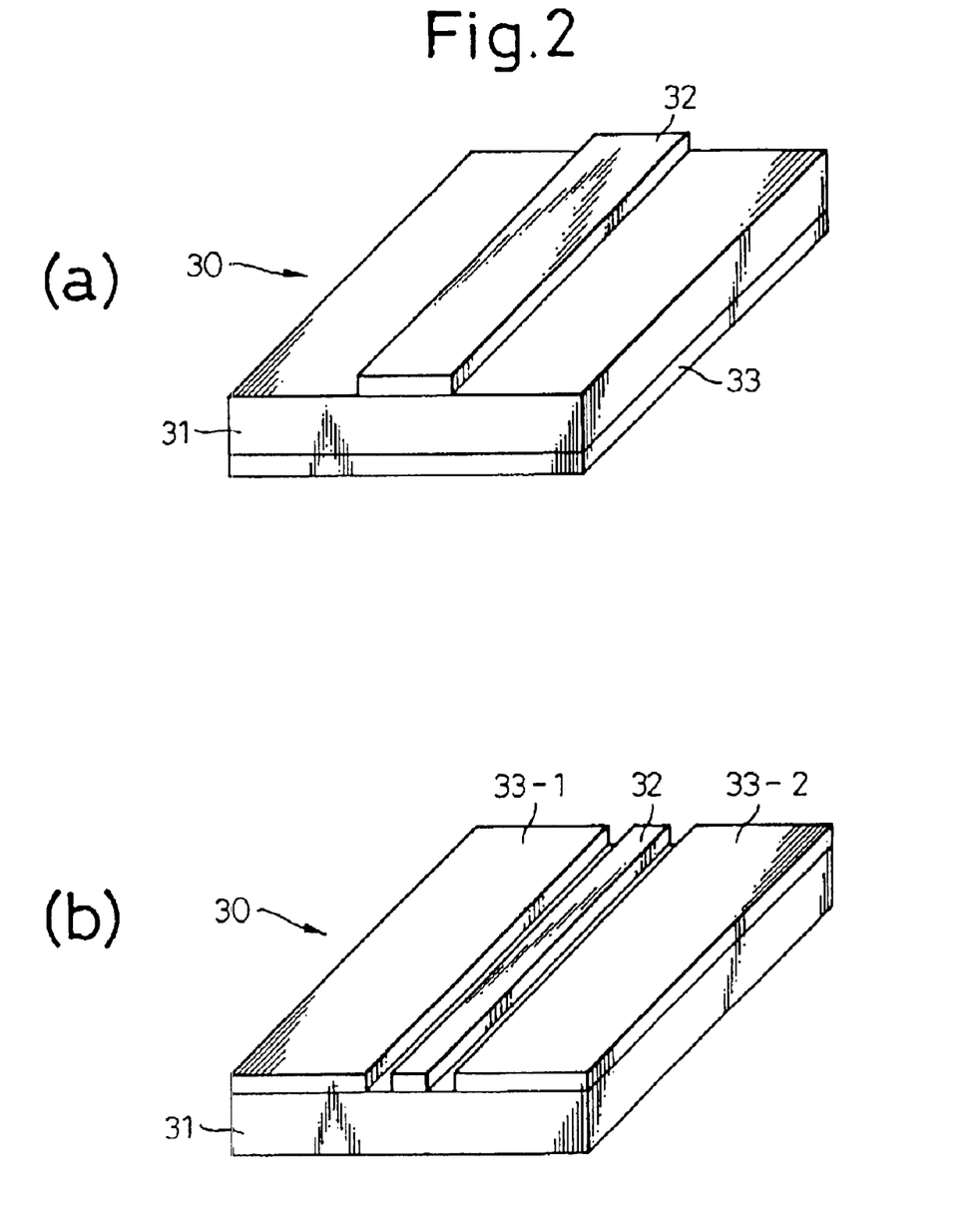
FIGS. 2(a) and 2(b) respectively provide perspective views showing a first example and second example of a flat circuit body forming the main part of a heat cutoff signal transmission unit according to the present invention.

FIGS. 2(a) and 2(b) respectively provide perspective views showing a first example and second example of a flat circuit body forming the main part of a heat cutoff signal transmission unit according to the present invention.

In the figure, reference numeral 30 is a flat circuit body forming the main part of the heat cutoff signal transmission unit 20.

FIG. 2(a) shows the case where the flat circuit body 30 is configured by a microstrip line structure, while FIG. 2(b) shows the case where the flat circuit body 30 is configured by a coplanar waveguide structure.

Referring to FIG. 2(a), this shows a flat circuit body 30 provided with a substrate 31 and with a signal transmission line 32 and ground layer 33 formed on one surface and the other surface of the substrate 31, where the substrate 31 is comprised of a dielectric material having a small heat conductivity and where the conductor portions forming the signal transmission line 32 and ground layer 33 are formed with a thin thickness able to suppress the flow of heat from the outside.

Figure 4:
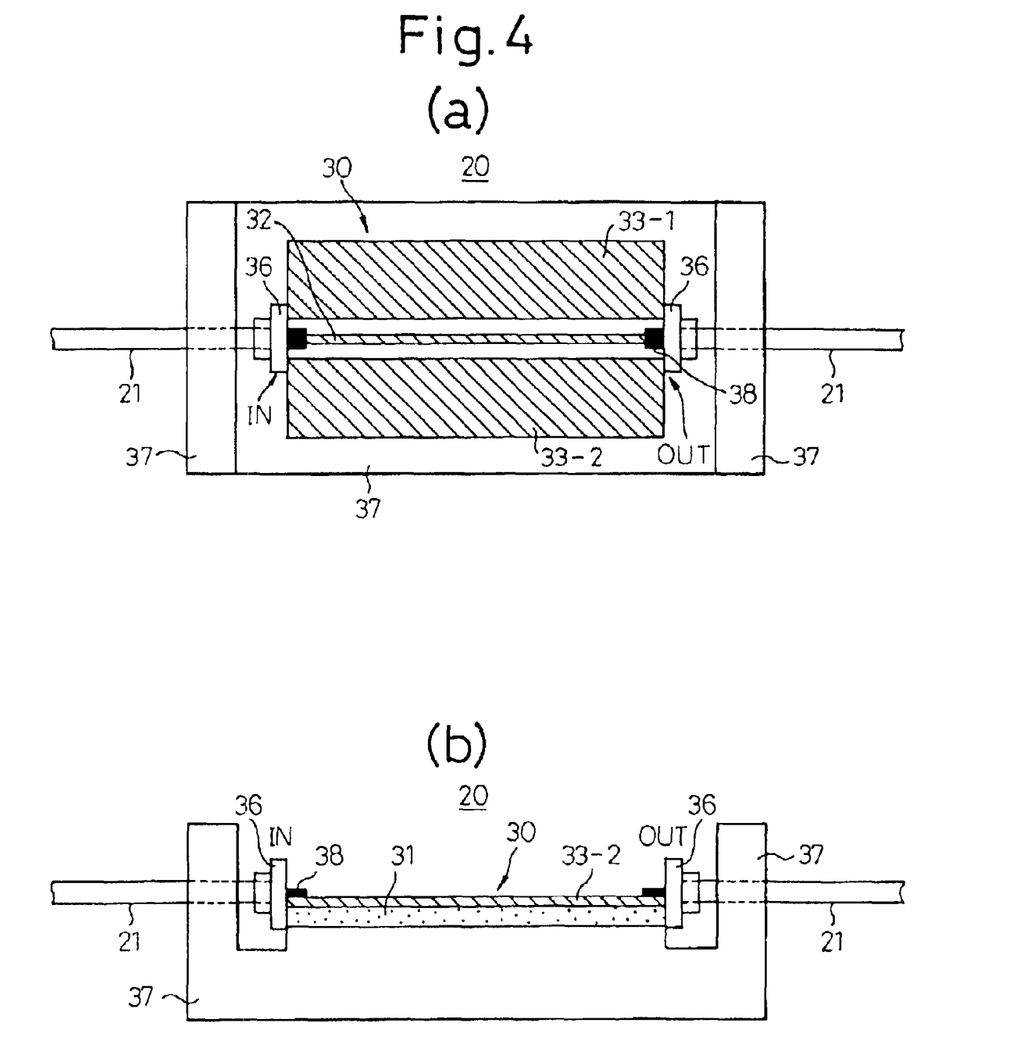
FIGS. 4(a) and 4(b) respectively provide views of a specific configuration of the heat cutoff signal transmission unit according to the present invention by a plan view and side view.

Then, referring to FIG. 2(b) and to FIGS. 4(a) and 4)b), this shows a flat circuit body 30 provided with a substrate 31, and a signal transmission line 32 and ground layers 33-1 and 33-2 formed on one surface of the substrate 31, where the substrate is comprised of a dielectric material having a small heat conductivity and where the conductor portions forming the signal transmission line 32 and ground layers 33-1 and 33-2 are formed with a thin thickness able to suppress the flow of heat from the outside.

In general, there is the known property that the flow rate of heat is proportional to the sectional area of the conductor through which the heat is propagated and is inversely proportional to its length. The applicant took note of the fact that a known microstrip line and coplanar waveguide can be used as a transmission medium to which the above known property can be easily applied and can be handle even at the pass band of the microwave band, and thereby reached the present invention.

Therefore, the applicant used the configuration of a microstrip line or coplanar waveguide as the basis to tremendously reduce the sectional areas of the signal transmission line and the ground layer. In addition, it selected a dielectric material having an extremely small heat conductivity as the substrate. In general, in the design of a microstrip line or coplanar waveguide, it is not usual to tremendously reduce the sectional areas of the conductor portions and to set the heat conductivity of the substrate portion small, but the present invention does this deliberately and therefore completed the heat cutoff signal transmission unit 20.

Therefore, according to the present invention, since the sectional areas of the ground layers 33, 33-1, and 33-2 are made small, the large amount of heat propagated through the outer conductor of the coaxial cable is sufficiently suppressed by the ground layer, and thus the load of the refrigeration machine 15 becomes lighter.

Further, even the heat propagated through the center conductor of the coaxial cable, which could not be suppressed in the past, is suppressed by the signal transmission line 32. Therefore, the increase in the contact resistance arising at the junction portion between the superconducting electronic device 12 and the transmission lines 13 and 14 is prevented.

Here, when looking at the relative advantages between when adopting the microstrip line structure (FIG. 2(a)) and when adopting the coplanar waveguide structure (FIG. 2(b)) as the flat circuit body 30, if using the microstrip line structure, since the surface of the ground layer 33 is broad and extends over the entire back surface of the substrate 31, while there is the disadvantage that the heat cutoff effect is inferior to that when using the coplanar waveguide structure, there is the advantage that the transmission loss due to insertion of the flat circuit body 30 into the transmission line is small since a microstrip line has less of a radiation loss.

On the other hand, when using the coplanar waveguide structure, since the sectional area of the ground layers 33-1 and 33-2 can be made smaller than the sectional area of the ground layer 33 in the case of use of the microstrip line structure, there is the advantage that the heat cutoff effect is large.

In either case, the heat cutoff effect is large due to the fact that the sectional area of the ground layer (33, 33-1, 33-2) conducting heat with the outer conductor of the coaxial cable is made small on the path to the electronic device 12. An example able to further increase this effect is shown in FIG. 3.

Figure 3:
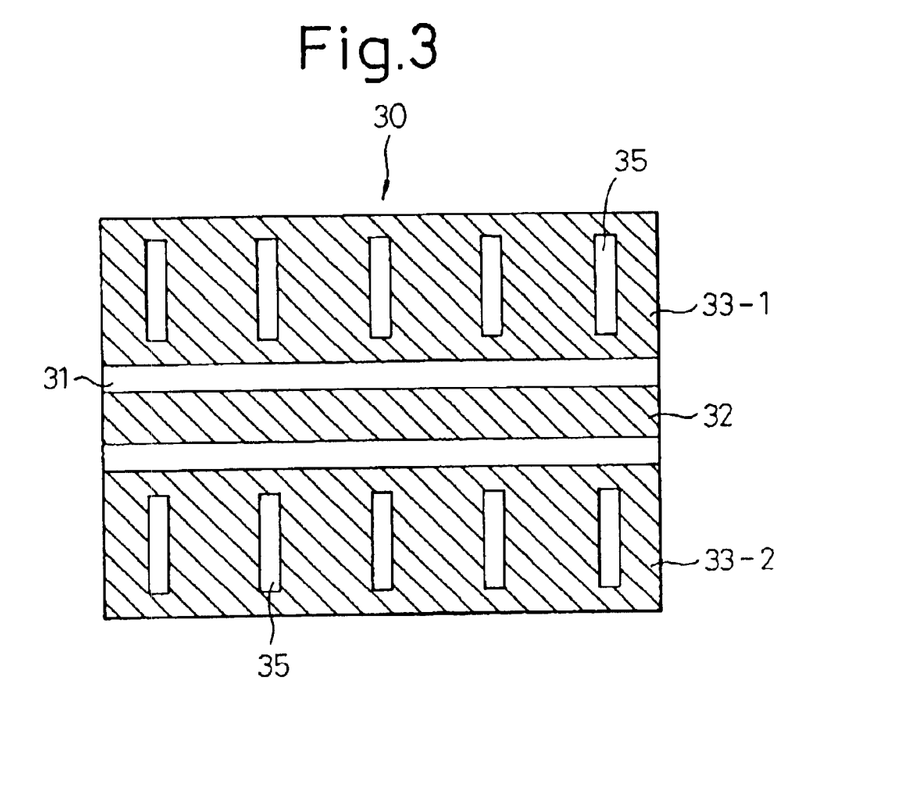
FIG. 3 is a plan view of an example modifying the ground layer of FIG. 2(b)

FIG. 3 is a plan view of an example modifying the ground layer of FIG. 2(b).

The feature shown in the figure is the slits 35. In the figure, the portions shown by the hatching are the conductor portions of the signal transmission line 32 and the ground layers 33-1 and 33-2. The rest of the portions are the substrate 31.

In this way, the heat cutoff effect is further enhanced by the formation, in the ground layers, of the slits 35 for making the sectional areas of the ground layers 33-1 and 33-2 substantially smaller.

In this case, the radiation loss increases due to the slits 35 and the above transmission loss increases. In fact, however, the length in the direction of transmission of the signal (signal transmission line length) is a short one of less than several centimeters and the increase in the transmission loss is extremely slight.

Note that the configuration of providing the slits in the ground layer can naturally be applied to the ground layer 33 of FIG. 2(a) as well, but since the pattern is substantially the same as the pattern shown in FIG. 3 (pattern of 33-1 or 33-2), the illustration is omitted.

Further, the slits for substantially reducing the sectional area are not limited to the rectangular shapes of FIG. 3 and may also be square shapes or circular shapes. Further, the direction of extension of the slits is not limited to the case of intersection with the signal transmission line 32 as shown in FIG. 3. It is also possible to provide a plurality of slits in parallel with the signal transmission line 32. If the total area of the slits increases, however, the radiation loss also increases, so the size and number of the slits should be suitably determined.

In FIGS. 4(a) and 4(b), the heat cutoff signal transmission unit 20 has the flat circuit body 30 shown in FIG. 2(b) at its center. Further, the heat cutoff signal transmission unit 20 has a connector 36 provided, at least, at one of the signal input end IN and signal output end OUT of the flat circuit body 30. Through this connector 36 of FIGS. 4(a) and 4(b), the center conductor (corresponding to reference numeral 2 in FIGS. 8(a), 8(b) and 8(c)) and outer conductor (corresponding to reference numeral 4 in FIG. 8(a), reference numeral 4' in FIG. 8(b) and reference numeral 4" in FIG. 8(c)) of the coaxial cable 21 connected from the outside and the signal transmission line 32 and ground layers 33-1 and 33-2 are electrically connected. Note that shows FIGS. 4(a) and 4(b) show an example of the provision of the connector 36 at both the signal input end IN and signal output end OUT.

Further, FIGS. 4(a) and 4(b) each shows the support 37 with the small heat conductivity supporting the substrate 31 and the coaxial cable 21 near the connector 36.

Note that while FIGS. 4(a) and 4(b) each shows a configuration based on the structure of FIG. 2(b) (coplanar waveguide), the configuration based on the structure of FIG. 2(a) (microstrip line) is substantially the same as the shown structure in FIG. 4. This is shown in FIG. 5.

Figure 5:
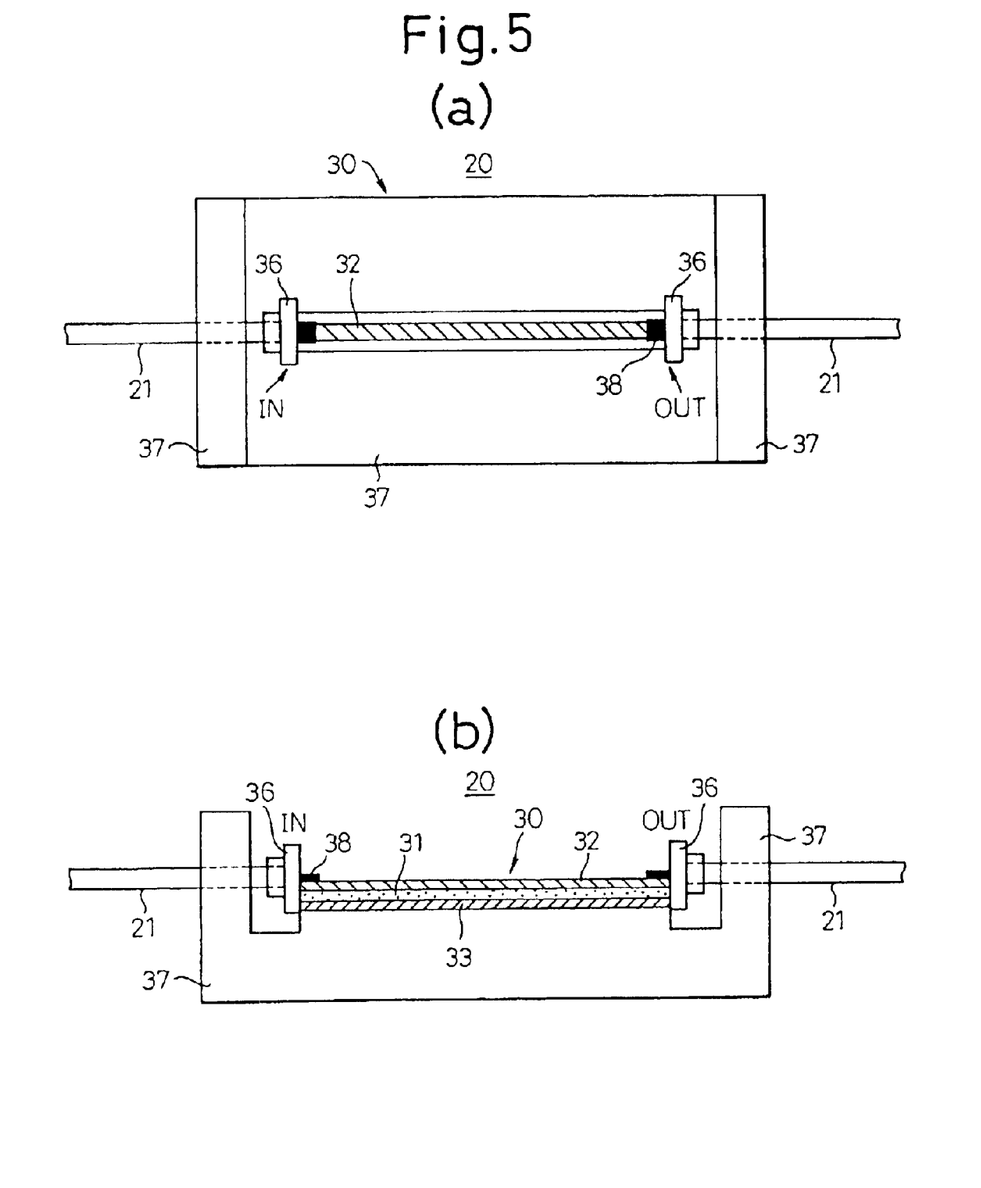
FIGS. 5(a) and 5(b) respectively provide views of another specific configuration of the heat cutoff signal transmission unit according to the present invention by a plan view and side view.

FIG. 5 is a view of another specific configuration of the heat cutoff signal transmission unit according to the present invention by a plan view (a) and side view (b). As again shown in each of FIGS. 5(a) and 5(b), the heat cutoff signal transmission unit 20 has a connector 36 provided, at least, at each of the signal input end IN and signal output end OUT of the flat circuit body 30. Through these connectors 36, the center conductor (corresponding to 2 in FIG. 8) and outer conductor (corresponding to 4 in FIG. 8) of the coaxial cable 21 connected from the outside and the signal transmission line 32 and ground layers 33 are electrically connected.

In FIGS. 5(a) and 5(b), the ground layers 33-1 and 33-2 shown in FIG. 4(a) are eliminated. Instead, the ground layer 33 is shown in FIG. 5(b). Further, in FIG. 5(b), the center signal transmission line 32 can be seen.

Figure 6:
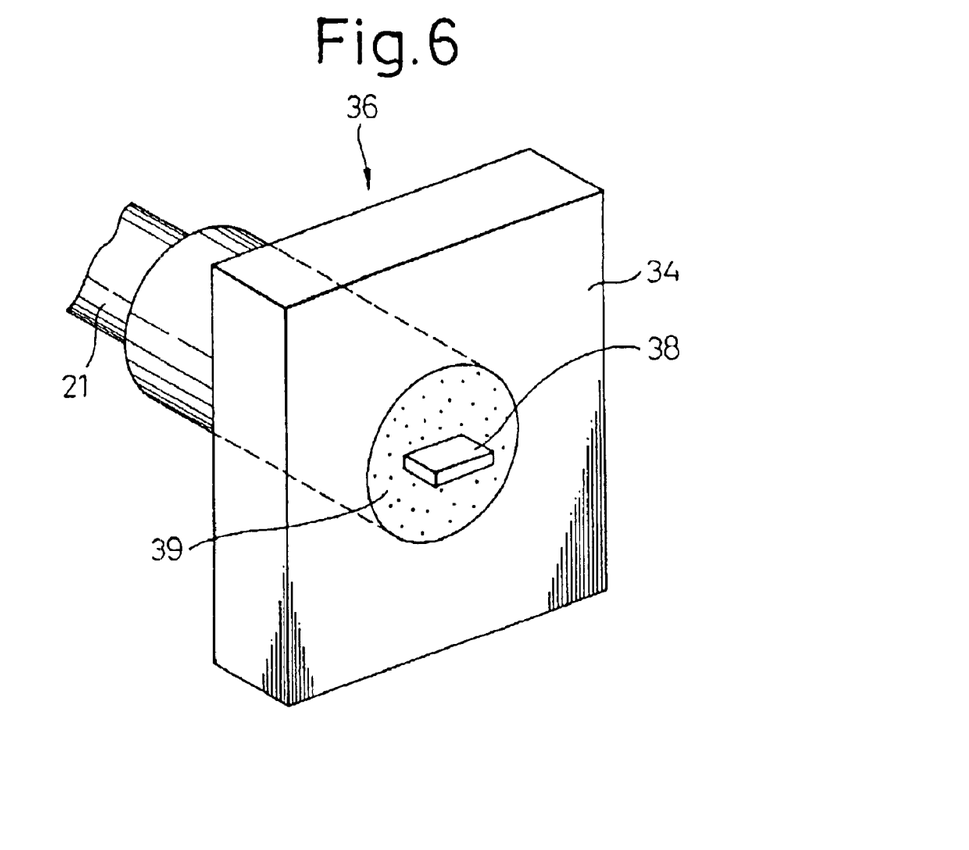
FIG. 6 is a perspective view of a connector 36 shown in FIGS. 4(a) and 4(b) and FIGS. 5(a) and 5(b)

FIG. 6 is a perspective view of a connector 36 shown in FIGS. 4(a) and 4(b) and in FIGS. 5(a) and 5(b).

The center of the metal connector 36 has a through hole. At the center of this is a center terminal 38 leading to the center conductor of the coaxial cable 21 (also illustrated in FIGS. 4(a) and 4(b) and FIGS. 5(a) and 5(b)). This center terminal 38 (also illustrated in FIGS. 4(a), 4(b), 5(a) and 5(b)) is fixed in the through hole by an insulator 39.

The illustrated surface 34 of the metal connector 36 of FIG. 6 and the ground layers (33 of FIG. 5(b), 33-1 of FIG. 4(a), and 33-2 of FIG. 4(b)) are joined by soldering etc. Further, the center end 38 and the signal transmission line 32 are also joined by soldering and are electrically connected.

The illustrated surface 34 of the metal connector 36 and the ground layer (33, 33-1, 33-2) are joined by soldering etc. Further, the center end 38 and the signal transmission line 32 are also joined by soldering and are electrically connected.

Next, the materials suitable for the present invention will be considered.

First, the conductor portions forming the signal transmission line 32 and the ground layers 33, 33-1, and 33-2 can be formed by metal plating. Further, the thickness is made at least the thickness of about the skin of the metal at the working frequency.

To metal plate the substrate 31, first a nickel or other underlying metal layer may be deposited by electroless plating, sputtering, vapor deposition, or another method, then plated by copper, silver, or another metal. There is no problem in the transmission characteristics so long as the thickness of the plating is at least the skin thickness of the metal.

Instead of the above metal plating, it is also possible to form the above conductor portions by metal thin films. In this case, the film thickness is made about 1 to 3 times the skin thickness of the metal at the working frequency. Making the metal thin film for example a thin film of copper and making it 1 to 3 times the skin thickness of the copper sometimes results in peeling off the film at the time of cooling due to the stress between the film made by deposition and substrate 31. A process such as annealing for film formation for easing the stress sometimes becomes necessary.

As the substrate 31 which is metal plated or formed with the metal thin film, it is also possible to form the dielectric material from a glass-ceramic composite material. In the present invention, it is more effective to use the above glass-ceramic composite material with a small heat conductivity compared with an alumina sintered substrate.

Further, looking at the support 37 (FIGS. 4(a) and 4(b) and This is shown FIGS. 5(a) and 5(b)), it is preferable to make the support by a resin material or a resin-glass composite material.

As the resin material or resin-glass composite material, it is possible to use a polycarbonate resin or glass-epoxy composite resin composite material or glass-polyimide resin composite resin etc.

The substrate 31 and support 37 and the coaxial cable 21 and support 37 are preferably joined using a polyimide resin or epoxy resin.

Here, the most preferable embodiment will be explained.

A glass-ceramic substrate 31 (thickness of 0.6 mm) with an extremely small heat conductivity (1.3 W/mK) is plated with copper to a thickness of 2 $\mu$m as the conductor portions (32, 33-1, and 33-2). At this time, an underlying nickel layer is deposited by electroless plating, then the copper is electroplated. Next, a conductor pattern such as shown in FIG. 2(b) and FIG. 4(a) is formed as a coplanar waveguide having a characteristic impedance of 50 ohms. The length of the waveguide is made 4 cm.

This flat circuit body 30 is fixed to a support 37 comprised of a glass-epoxy resin composite material with a small heat conductivity, the connector 36 is fixed from the side surface, and the conductor portion of the flat circuit body 30 and connector 36 are soldered.

The coaxial cable 21 leading to the superconducting electronic device 12 and the coaxial cable 21 leading to the outside circuit are connected to the connector 36. The coaxial cable 21 is fixed at the upright portion of the support 37. For this, a polyimide resin or a two-liquid curing type (curing time of at least 12 hours) epoxy resin is used.

This heat cutoff signal transmission unit, as shown in FIG. 1, may be positioned anywhere in the coaxial cable 21. Therefore, handling is easy and the degree of freedom is high.

The heat propagated from the outside is suppressed due to the substrate 31 comprised of the dielectric with the small heat conductivity, the substrate support 37, and the conductor portion of the metal plating with the small sectional area. Note that the heat propagated through the center conductor of the coaxial cable 21 is also cut off by the heat cutoff signal transmission unit 20. The superconducting electronic device 12 is held at a stable and low temperature state.

In the preferred embodiment, the flat circuit body 30 was made a coplanar waveguide, but there is no great difference in effect even if using a microstrip line structure where the conductor portions are plated with copper to a thickness of 5 $\mu$m such as shown in FIG. 2(a).

Further, as shown in FIG. 3, by making five slits 35 in the ground layers 33-1 and 33-2 to make the substantive sectional area smaller, it was confirmed that the cutoff effect of heat propagated through the ground layer is further enhanced.

The transmission loss and amount of inflow of heat when using the heat cutoff signal transmission unit 20 based on the above preferred embodiment were simulated, whereupon the result was obtained that the transmission loss can be substantially ignored and the amount of inflow of heat (W) can be reduced close to one order compared with the past. This is shown in FIG. 7.

Figure 7:
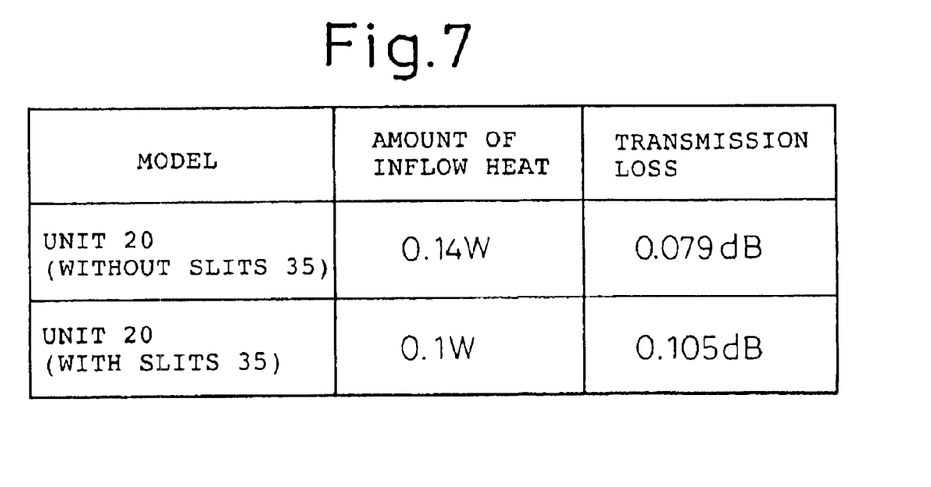
FIG. 7 is a view of results of simulation of a heat cutoff effect and transmission loss due to introduction of a heat cutoff signal transmission unit according to the present invention.

FIG. 7 is a view of results of simulation of a heat cutoff effect and transmission loss due to introduction of a heat cutoff signal transmission unit according to the present invention. Further, simultaneously, it shows differences in the effect due to the presence of the above-mentioned slits 35.

Referring to FIG. 7, the amount of inflow of heat is sharply reduced to 0.1 to 0.14 W compared with the past (about 1 W) due to the heat cutoff signal transmission unit 20. On the other hand, looking at the transmission loss arising due to the insertion of the unit 20, this is 0.079 to 0.105 dB or there is almost no loss.

The model used for this simulation was the unit 20 of the type shown in FIGS. 4(*a*) and 4(*b*). Further, the simulation was performed for the case of formation of the slits 35 of FIG. 3 in the ground layers 33-1 and 33-2 of the unit 20 and the case of no formation. Due to the formation of the slits 35, the transmission loss increased slightly from 0.079 to 0.105 dB compared with the case of no formation, but the effect of suppression of the inflow of heat is greatly improved from 0.14 W to 0.1 W. Compared with the demerit of the increase in the loss, the merit of the reduction of the inflow of heat is far greater.

Note that the conditions for the unit 20 forming the model of the above simulation were as follows:

Total length of unit: 4 cm
Total width of unit: 15 cm
Conductor portion: Copper (thickness 2 $\mu$m)
Substrate portion: Glass-ceramic composite material
  (Dielectric constant $\epsilon_r$=9.4)
  (Thickness: 0.6 mm)
  ($\tan\delta$=0.0003)
Support: Glass-epoxy composite material
  (Thickness of bottom part: 0.5 mm)
Coaxial cable: Semirigid cable at both input side and output side, with length of 15 mm, cable diameter of 2.2 mm, and characteristic impedance of 50 ohms
  Frequency: 2 GHz As explained above, according to the present invention, it is possible to suppress the inflow of heat from the outside to a refrigeration machine 15 required for operating a superconducting electronic device 12 and possible to cool a plurality of superconducting electronic devices by a single refrigeration machine. Alternatively, it is possible to reduce the cooling capacity of the refrigeration machine 15 and simultaneously possible to suppress the power consumption. Further, since an ordinary transmitting means or ordinary coaxial cable is used as it is, it is possible to realize the invention inexpensively and easily and possible to cut off heat easily. In this case, the heat cutoff signal transmission unit of the present invention may be introduced at any portion of the coaxial cable, so by using an ordinary semi-flexible cable or semirigid cable together, handling in the vacuum container is easy and the degree of freedom is high. Therefore, there is the advantage that it is possible to handle various shapes of vacuum containers or refrigeration machines.

What is claimed is:

1. A heat cutoff signal transmission unit characterized by being comprised of a flat circuit body provided with a substrate and with a signal transmission line and a ground layer both disposed on the substrate, where the substrate is comprised of a dielectric material having a low heat conductivity and where conductor portions providing the signal transmission line and ground layer have a thin thickness enabling suppression of the flow of external heat, and the ground layer having slits for substantially reducing a sectional area of the ground layer to increase a thermal resistance through said sectional area;

wherein said heat cutoff signal transmission unit has connectors respectively provided at each of a signal input end and signal output end of said flat circuit body, wherein said connectors are used for electrically connecting a center conductor and an outer conductor of a coaxial cable, each respectively connected externally to the signal transmission line and the ground layer, and wherein said heat cutoff signal transmission unit is further provided with a support having a small heat conductivity for supporting said substrate and said coaxial cable near said connectors.

2. A heat cutoff signal transmission unit as set forth in claim 1, wherein said flat circuit body is configured by a microstrip line structure.

3. A heat cutoff signal transmission unit as set forth in claim 1, wherein the flat circuit is configured by a coplanar waveguide structure.

4. A heat cutoff signal transmission unit as set forth in claim 1, wherein said support is comprised of a resin material or a resin-glass composite material.

5. A heat cutoff signal transmission unit as set forth in claim 4, wherein said resin material or resin-glass composite material is a polycarbonate resin, glass-epoxy resin composite material, or glass-polyimide resin composite material.

6. A heat cutoff signal transmission unit as set forth in claim 1, wherein said substrate and said support and said coaxial cable and said support are joined using a polyimide resin or epoxy resin.

7. A heat cutoff signal transmission unit as set forth in claim 1, wherein conductor portions providing the signal transmission line and the ground layers are provided by a metal formed by plating, and the thickness of the metal is at least about a skin thickness of the metal at a working frequency.

8. A heat cutoff signal transmission unit as set forth in claim 1, wherein the conductor portions providing the signal transmission line and the ground layers are provided by thin films comprising a metal, and the thickness of the conductor portions is about 1 to 3 times a skin thickness of the metal at a working frequency.

9. A heat cutoff signal transmission unit as set forth in claim 1, wherein said dielectric material comprising said substrate is comprised of a glass-ceramic composite material.

10. A superconducting signal transmission apparatus characterized by being provided with a vacuum container;

a superconducting electronic device provided in the vacuum container;

an input side transmission line and an output side transmission line, both comprising coaxial cables passing through the vacuum container and further being connected, respectively, to a signal input end and signal output end of the superconducting electronic device; and a cooling mechanism for cooling the superconducting electronic device;

wherein a respective heat cutoff signal transmission unit is inserted into each of the input side transmission line and output side transmission line, wherein each said heat cutoff signal transmission unit comprises a flat circuit body provided with a substrate and with a signal transmission line and a ground layer both disposed on the substrate, where the substrate comprises a dielectric material having a low heat conductivity and where conductor portions providing the signal transmission line and ground layer have a thin thickness enabling suppression of the flow of external heat and the ground layer having slits for substantially reducing a sectional area of said ground layer to increase a thermal resistance through said sectional area, and wherein said coaxial cables are coaxial cables each having a heat cutoff structure at an outer conductor thereof.

* * * * *